(12) United States Patent
Lee (10) Patent No.: US 9,036,282 B2
(45) Date of Patent: May 19, 2015

(54) ADJUSTABLE ATTACHING LENS DEVICE

(71) Applicant: Princeton Wen-Yuan Lee, Nantou County (TW)

(72) Inventor: Princeton Wen-Yuan Lee, Nantou County (TW)

( * ) Notice: Subject to any disclaimer, the term of this patent is extended or adjusted under 35 U.S.C. 154(b) by 0 days.

(21) Appl. No.: 14/063,881

(22) Filed: Oct. 25, 2013

(65) Prior Publication Data

US 2015/0022910 A1   Jan. 22, 2015

(30) Foreign Application Priority Data

Jul. 18, 2013 (TW) .............................. 102213616 U (51) Int. Cl.
  *G02B 7/02* (2006.01)
  *G03B 21/14* (2006.01)
  *G02B 7/04* (2006.01)

(52) U.S. Cl.
  CPC .. *G02B 7/04* (2013.01); *G02B 7/02* (2013.01); *G02B 7/023* (2013.01); *G03B 21/14* (2013.01)

(58) Field of Classification Search
  CPC ............ G02B 7/00; G02B 7/02; G02B 7/023; G02B 7/04; G03B 21/14
  USPC .......... 359/811, 819, 822, 823; 353/100, 101; 396/505
  See application file for complete search history.

(56) References Cited

U.S. PATENT DOCUMENTS

| 3,354,938 | A | * | 11/1967 | Carignan et al. | ............ 164/151.2 |
| 3,488,872 | A | * | 1/1970 | Levy, Jr. | .......................... 40/365 |
| 5,805,362 | A | * | 9/1998 | Hayes | ........................... 359/819 |
| 6,652,124 | B2 | * | 11/2003 | Schubert et al. | ............... 362/285 |

* cited by examiner

*Primary Examiner* — Loha Ben

(57) ABSTRACT

Disclosed is an adjustable attaching lens device comprising a lens holding member including a flexible confining strip and an adjustable fastener that is for adjusting a fastening position of the flexible confining strip, wherein the flexible confining strip is bent to confine a lens attaching hole with a given size and a given shape for holding an optical lens; and an attaching member, provided on the lens holding member in a manner that the attaching member is facing toward the same side of the lens attaching hole, for attaching with an attaching surface so that the lens attaching hole corresponds to an optical image grabbing element of an external device. The various kinds of detachable lenses are applied to an electric device with lens, and thus the detachable lens compatible to a specific electric device can be used for a different device.

10 Claims, 8 Drawing Sheets

ADJUSTABLE ATTACHING LENS DEVICE

CROSS REFERENCE TO RELATED APPLICATION

This application claims priority to Taiwanese Patent Application No. 102213616, filed Jul. 18, 2013, which is hereby incorporated by reference.

FIELD OF THE INVENTION

The present invention relates to a lens attachment device, and more particularly to an adjustable attaching lens device.

BACKGROUND OF THE INVENTION

With the development of modern technology, there are many electric devices installed with a lens for a user to easily take photography. However, some electric devices, such as a mobile phone, a table PC, and a notebook, are not allowed to exchange the lenses. As a result, it usually happened that a desired picture cannot be obtained in a specific situation that the lens capability of the electric devices is limited. For example, in a prior art, a focal length of the lens of a conventional mobile phone is unchangeable, so it becomes difficult for taking the lens of the mobile phone as a suitable camera device to take a far picture well. Accordingly, an idea of providing an additional detachable lens for the electric device is submitted in an attempt to enable these conventional electric devices to be suitable for any picture taking situation.

However, since a conventional detachable lens is only for some specific electric devices, the detachable lens compatible to a specific electric device cannot be used for a different device, and therefore a user needs to buy several different kinds of detachable lenses for different electric devices to thus cost money and decrease the applicability for the electric device having lens and the detachable lens.

SUMMARY OF THE INVENTION

Accordingly, an aspect of the present invention is for providing an adjustable attaching lens device to enable the various detachable lenses to be applied to an electric device having a lens, and thus the detachable lens compatible to a specific electric device can be used in a different device.

The present invention provides an adjustable attaching lens device comprising a lens holding member including a flexible confining strip and an adjustable fastener that is for adjusting a fastening position of the flexible confining strip, wherein the flexible confining strip is bent to confine a lens attaching hole with a given size and a given shape for holding an optical lens; and an attaching member, provided on the lens holding member in a manner that the attaching member is facing toward the same side of the lens attaching hole, for attaching with an attaching surface so that the lens attaching hole corresponds to an optical image grabbing element of an external device.

In a preferred embodiment of the present invention, the external device is supplied with the attaching surface for being attached by the attaching member.

In a preferred embodiment of the present invention, it further comprises a connecting member that is provided with a clasping element and a fixing plate, wherein the clasping element is formed extending from a side of the fixing plate so as to clasp the external device, and the fixing plate has the attaching surface for being attached by the attaching member.

In a preferred embodiment of the present invention, the fixing plate is provided with a lens hole that is corresponding to the lens attaching hole and the optical image grabbing element.

In a preferred embodiment of the present invention, the fixing plate is formed of a magnetically attaching material, the attaching member is a magnetic member, and the attaching member is in contact to attach with the attaching surface of the fixing plate by means of magnetism.

In a preferred embodiment of the present invention, the attaching member is provided with a focus length adjusting element for adjusting a relative distance between the lens holding member and the external device.

In a preferred embodiment of the present invention, the flexible confining strip is provided at a wall of the lens attaching hole with a gear shaped slip-free uneven element.

In a preferred embodiment of the present invention, attaching members are provided as multiple ones.

In a preferred embodiment of the present invention, the fixing plate is provided with a hanging ring.

In a preferred embodiment of the present invention, the flexible confining strip is formed as an integrated one.

By means of the present invention, the flexible confining strip of the lens holding member is confined to form the lens attaching hole having a given size and a given shape for holding various optical lens, and the attaching members is used for fastening the optical lens with the external device, so that the external device can attach with various optical lenses to thus enhance photographing ability for the external device. In addition, the external device can photograph an image from an instrument having its own lens by use of the adjustable attaching lens device of the present invention. As an example is taken that an image picture is grabbed from an ophthalmology inspecting instrument for a doctor to easily explain the symptom for the patient to thus enhance the quality of diagnosis and treatment The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
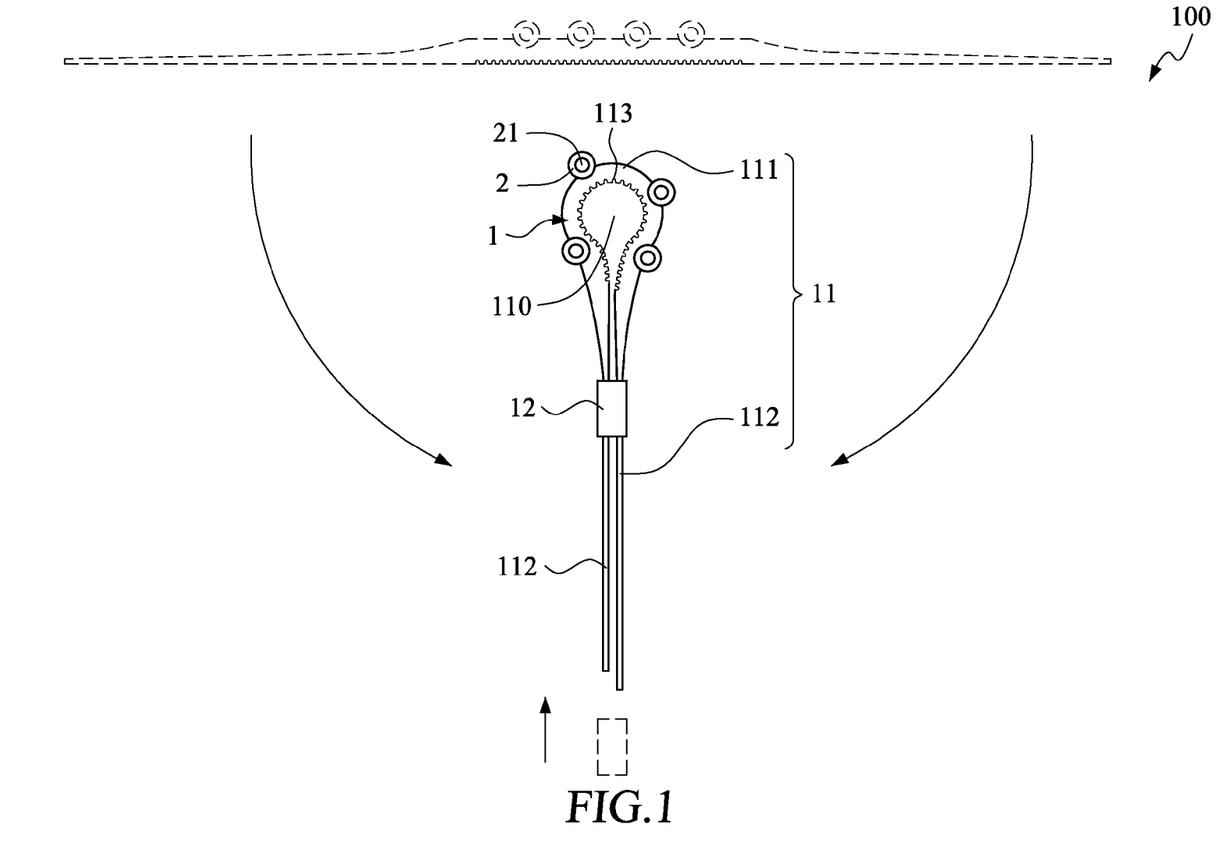
FIG. 1 is a front view illustrating an adjustable attaching lens device according to a first embodiment of to the present invention.
Figure 2:
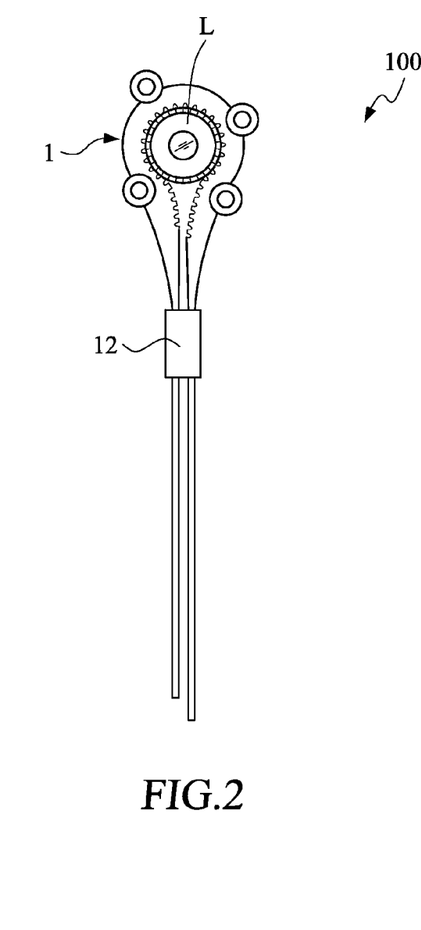
FIG. 2 is a front view illustrating the adjustable attaching lens device according to the first embodiment of the present invention.
Figure 3:
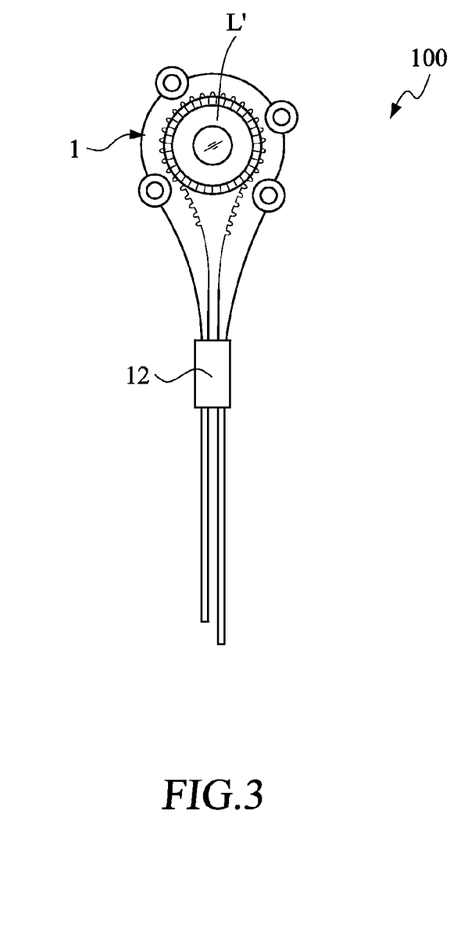
FIG. 3 is a front view illustrating the adjustable attaching lens device according to the first embodiment of the present invention with an adjustable fastener at a different position.

As referring to FIG. 1 to FIG. 5, an adjustable attaching lens device 100 according to a first embodiment of the present invention includes a lens holding member 1 and four attaching members 2. The lens holding member 1 includes a flexible confining strip 11 and an adjustable fastener 12. In an embodiment, the flexible confining strip 11 is an integrated bendable strip. In a middle portion of the flexible confining strip 11, there is a confining element 111 that extends as two adjusting elements 112 extending toward from both sides of the confining element 111. The confining element 111 has a gear shaped slip-free uneven element 113. The flexible confining strip 11 is bent to curve the confining element 111 for forming a lens attaching hole 110. The lens attaching hole 110 is used for holding an optical lens L, and the gear shaped slip-free uneven element 113 is formed on a wall of the lens attaching hole 110 for increasing a friction between the lens attaching hole 110 and the optical lens L. The flexible confining strip 11 is bent and the related positions of the two adjusting elements 112 are adjusted in a manner that a size and a shape of the lens attaching hole 110 is suitably obtained. Thereafter, the two adjusting elements 112 are fastened with each other at an attached position by the adjustable fastener 12. Accordingly, the lens attaching hole 110 can be adjusted with respect to various sizes and shapes of different optical lenses L, L', as shown in FIG. 2 and FIG. 3.

Figure 4:
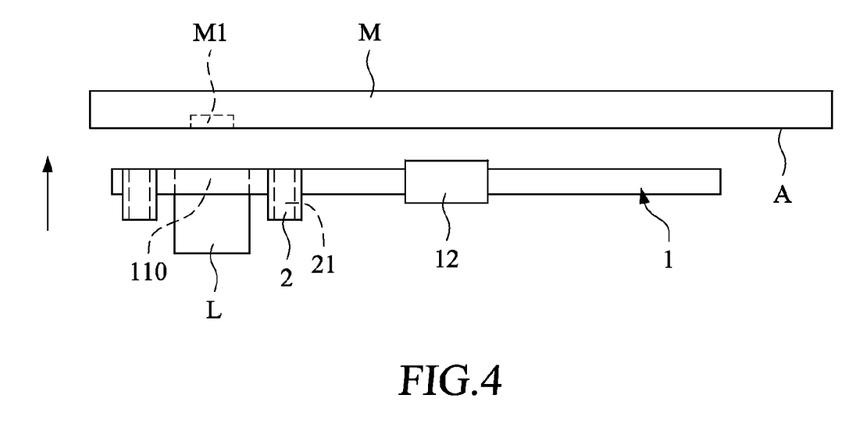
FIG. 4 is a schematic diagram illustrating the adjustable attaching lens device according to the first embodiment of the present invention.
Figure 5:
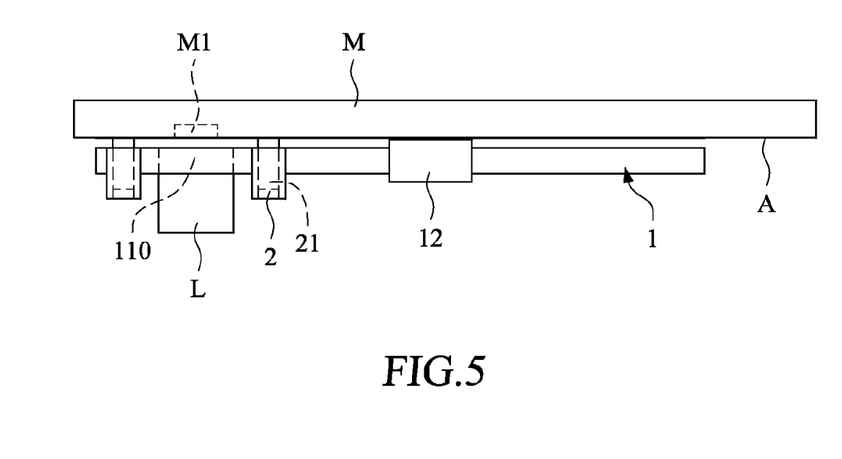
FIG. 5 is a schematic diagram illustrating the adjustable attaching lens device according to the first embodiment of the present invention with a lens holding member positioned close to an external device.

As referring to FIG. 4 and FIG. 5, the attaching member 2 is a magnetic member and includes a focus length adjusting element 21. There are four attaching members 2 supplied on the lens holding member 1 in a way that the attaching sides of the attaching member 2 are facing the same direction to thus attach with an attaching surface A of an external device M to allow the lens attaching hole 110 in a position corresponding to an optical image grabbing element M1 of the external device M. In an embodiment of the present invention, the external device M is a smart phone, and the attaching surface A of the smart phone is formed of a magnetically attaching material. The attaching members 2 are in contact to attach the attaching surface A by means of magnetism so as to connectedly fasten the lens holding member 1 to the external device M in a manner that the optical lens L is held and confined in the lens attaching hole 110 in a direction of facing the optical image grabbing element M1 of the external device M. The focus length adjusting element 21 has a screw thread that is screwed for adjusting a position of the focus length adjusting element 21 in relation to the attaching element 2, so that a distance between the optical image grabbing element M1 and the optical lens L is adjusted to a proper length for clearly focus an object.

Under the structure as above, the lens holding member 1 is suitable for various kinds of lenses with different sizes by using attaching members 2 to fasten the optical lens L with the external device M. Accordingly, the external device M may improve the ability of photography by connecting various optical lenses. For example, it enables a smart phone to connect with a telescope, a microscope, or lenses of medical devices for photographing desired pictures.

Figure 6:
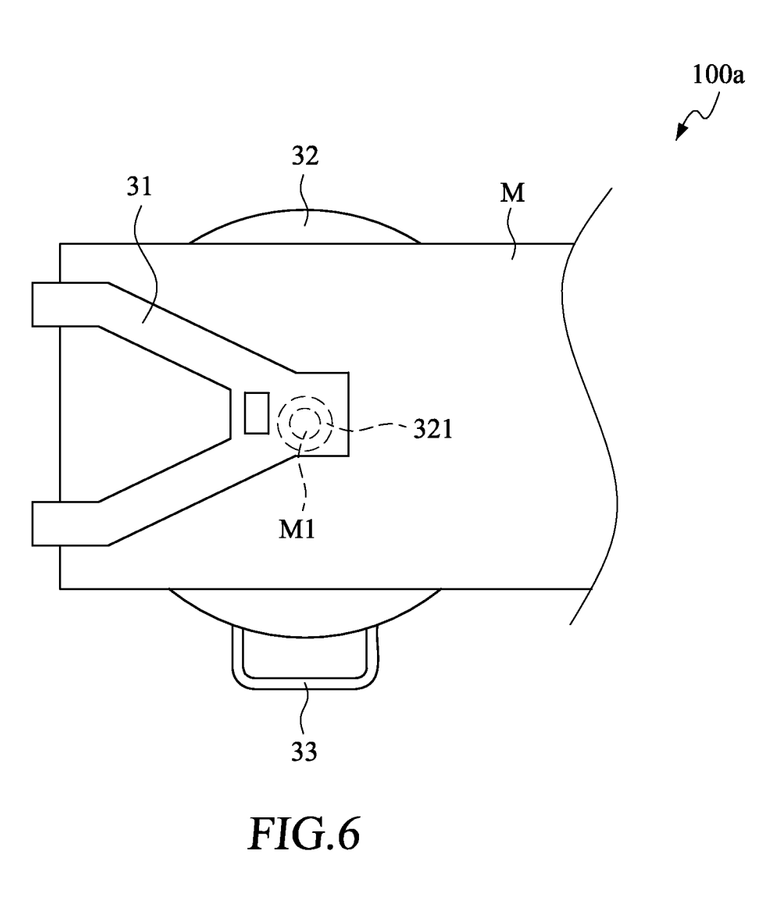
FIG. 6 is a top view of a schematic diagram illustrating an adjustable attaching lens device according to a second embodiment of the present invention.
Figure 7:
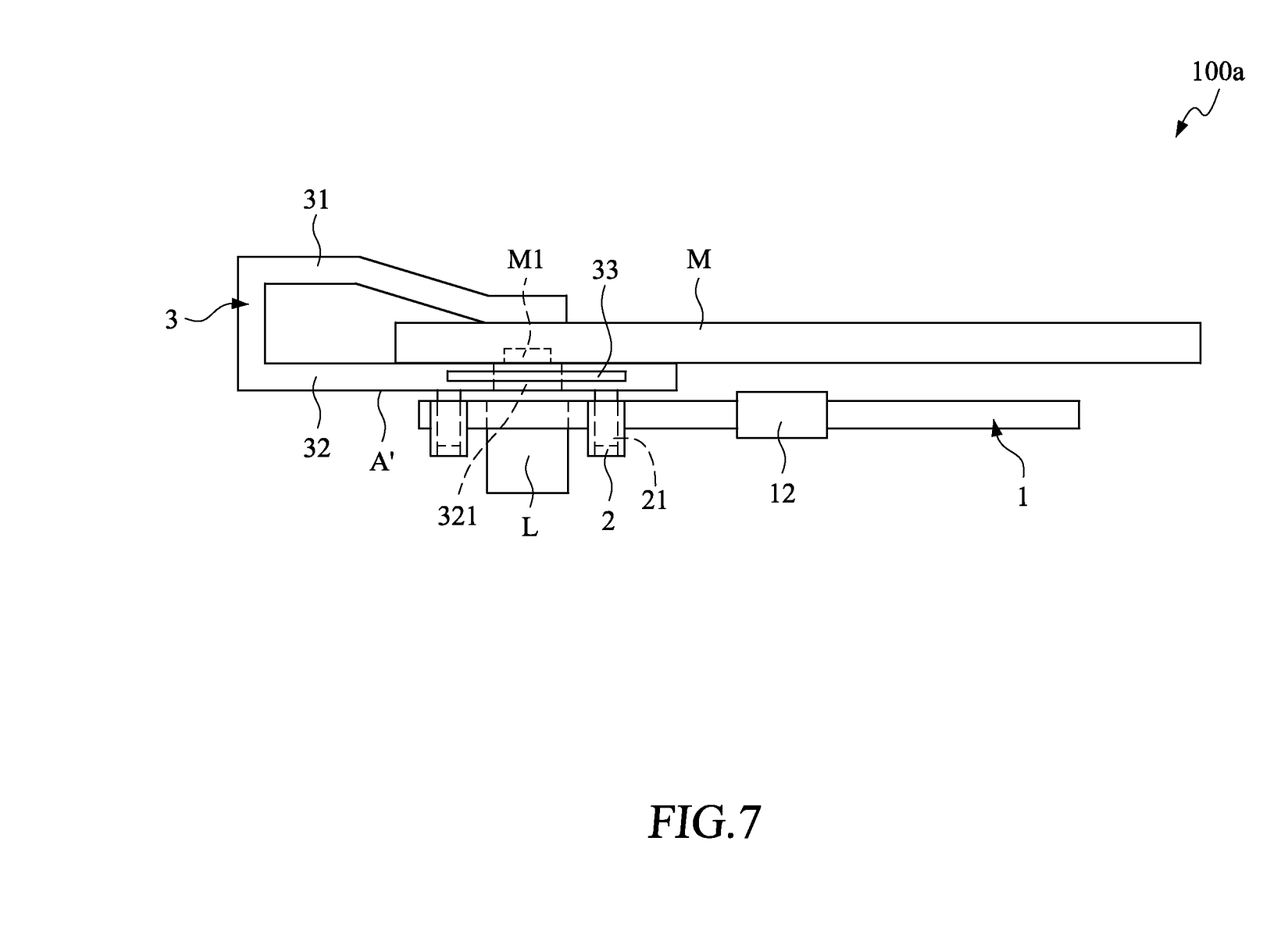
FIG. 7 is a side view of a schematic diagram illustrating the adjustable attaching lens device according to the second embodiment of the present invention.

As referring to FIG. 6 and FIG. 7, an adjustable attaching lens device 100a in a second embodiment of the present invention further includes a connecting member 3. The connecting member 3 has a clasping element 31, a fixing plate 32, and a hanging ring 33. The clasping element 31 and the hanging ring 33 are both formed extending from two sides of the fixing plate 32. The clasping element 31 is used for clasping the external device M. The hanging ring 33 is provided for connecting the connecting member 3 to the external device M, as connecting a pendant to a smart phone. The fixing plate 32 is formed of a magnetically attaching material, such as iron, and is formed with a lens hole 321 corresponding to the optical image grabbing element M1 of the external device M. Because the fixing plate 32 is of a magnetically attaching material, the attaching member 2 connectedly attaches with the attaching surface A' by means of magnetism to firmly connect the lens holding member 1 with the external device M to thus create a corresponding position relationship among the optical image grabbing element M1, the lens attaching hole 110 and the lens hole 321. Thereafter, the external device M can be any material that is allowed to be clasped within the connecting member 3. Of course, the present invention is not limited to this, and the attaching member may be any material if it is adhesive for attaching on a surface of any external device.

Figure 8:
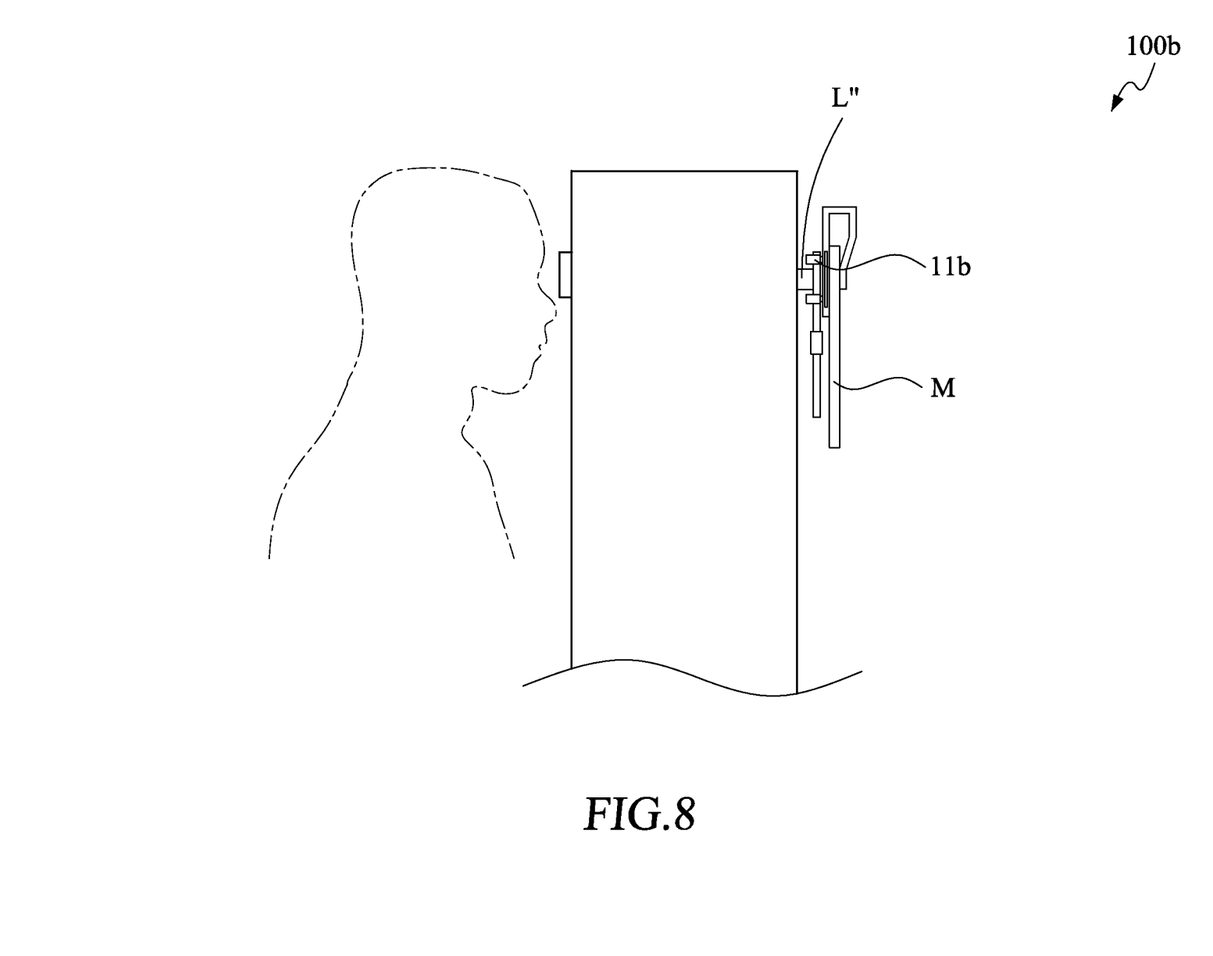
FIG. 8 is a schematic diagram illustrating an adjustable attaching lens device according to a third embodiment of the present invention.

As referring to FIG. 8, an optical lens L" held by an adjustable attaching lens device 100b in a third embodiment of the present invention is a lens of an ophthalmology inspecting instrument. The flexible confining strip 11b is used for holding the optical lens L" of the ophthalmology inspecting instrument, so that an external device M, such as a smart phone is used for grabbing a picture photographed by the optical lens L". Thereafter, a doctor can easily explain the image picture for his patient and thus the quality of diagnosis and treatment is improved.

Figure 9:
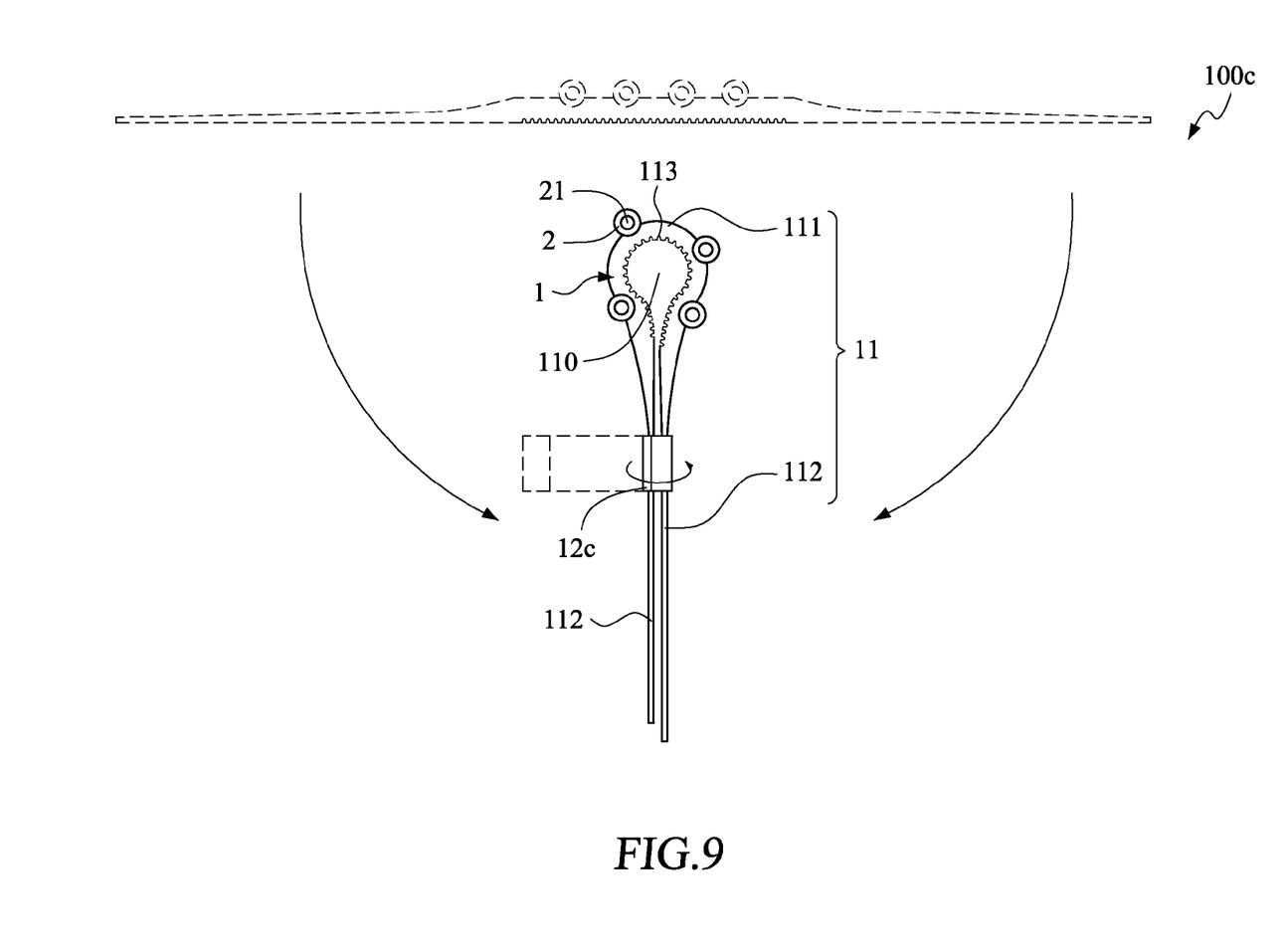
FIG. 9 is a schematic diagram illustrating an adjustable attaching lens device according to a fourth embodiment of the present invention.

As referring to FIG. 9, an adjustable fastener 12c of an adjustable attaching lens device 100c in a fourth embodiment of the present invention is an attaching band, such as a Velcro®. The two adjusting element 112 is wrapped by the band for being fastened to avoid loosening.

Figure 10:
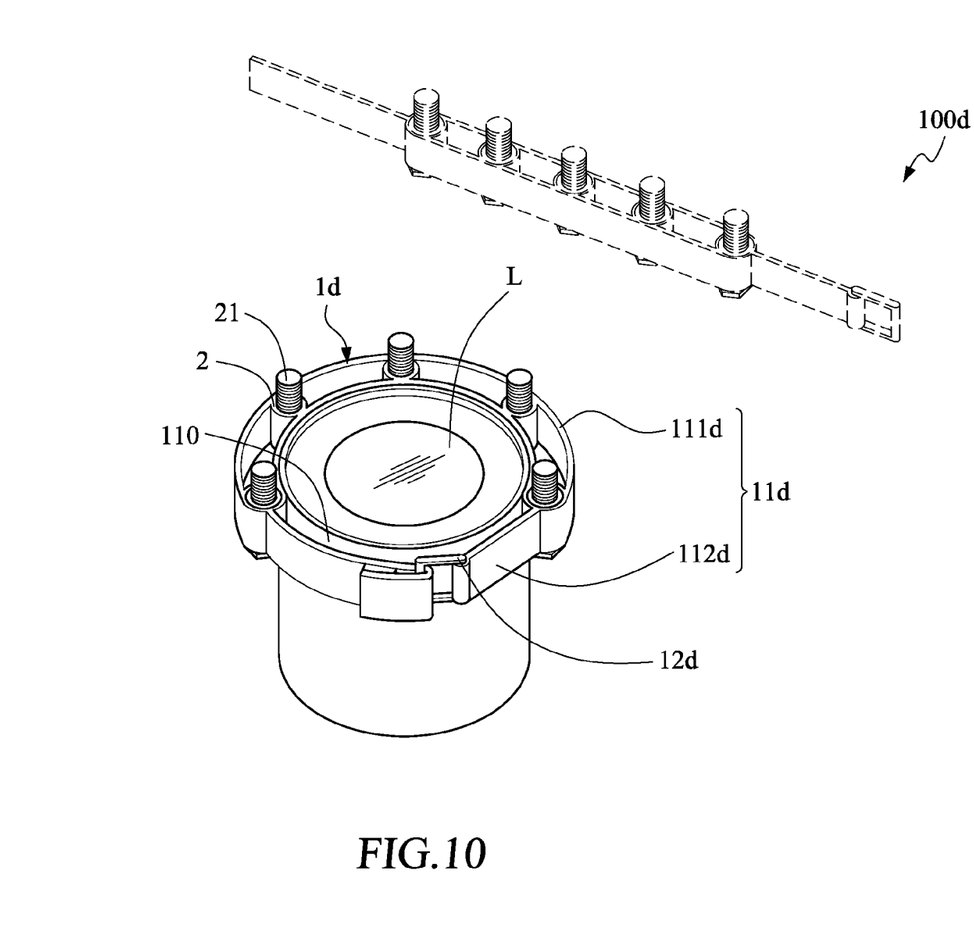
FIG. 10 is a perspective view illustrating an adjustable attaching lens device according to a fifth embodiment of the present invention.

As referring to FIG. 10, a lens holding member 1d of an adjustable attaching lens device 100d in a fifth embodiment of the present invention is different from that of the first embodiment in that a flexible confining strip 11d of the lens holding member 1d is formed as a leather belt and the adjustable fastener 12d is formed as a buckle of the leather belt. Further, the width of the confining element 111d of the flexible confining strip 11d is larger than that of the adjusting element 112d, and the adjustable fastener 12d is provided on the adjusting element 112d extending in one side of the flexible confining strip 11d. The optical lens L is fastened by the lens attaching hole 110 that is formed by setting the adjusting element 112d in another side of the flexible confining strip 11d into the adjustable fastener 12d. In the embodiment, the adjusting element 112d that is set into the buckle is provided with an attaching band to avoid loosening.

The above description should be considered as only the discussion of the preferred embodiments of the present invention. However, a person skilled in the art may make various modifications to the present invention. Those modifications still fall within the spirit and scope defined by the appended claims.

What is claimed is:

1. An adjustable attaching lens device, comprising:

a lens holding member including a flexible confining strip and an adjustable fastener that is for adjusting a fastening position of the flexible confining strip, wherein the flexible confining strip is bent to confine a lens attaching hole with a given size and a given shape for holding an optical lens; and an attaching member, provided on the lens holding member in a manner that the attaching member is facing toward the same side of the lens attaching hole, for attaching with an attaching surface so that the lens attaching hole corresponds to an optical image grabbing element of an external device.

2. The adjustable attaching lens device as claimed in claim 1, wherein the external device is supplied with the attaching surface for being attached by the attaching member.

3. The adjustable attaching lens device as claimed in claim 1, further comprising a connecting member that is provided with a clasping element and a fixing plate, wherein the clasping element is formed extending from a side of the fixing plate so as to clasp the external device, and the fixing plate has the attaching surface for being attached by the attaching member.

4. The adjustable attaching lens device as claimed in claim 3, wherein the fixing plate is provided with a lens hole that corresponds to the lens attaching hole and the optical image grabbing element.

5. The adjustable attaching lens device as claimed in claim 3, wherein the fixing plate is formed of a magnetically attaching material, the attaching member is a magnetic member, and the attaching member is in contact to attach with the attaching surface of the fixing plate by means of magnetism.

6. The adjustable attaching lens device as claimed in claim 3, wherein the fixing plate is provided with a hanging ring.

7. The adjustable attaching lens device as claimed in claim 1, wherein the attaching member is provided with a focus length adjusting element for adjusting a relative distance between the lens holding member and the external device.

8. The adjustable attaching lens device as claimed in claim 1, wherein the flexible confining strip is provided at a wall of the lens attaching hole with a gear shaped slip-free uneven element.

9. The adjustable attaching lens device as claimed in claim 1, wherein attaching members are provided as multiple ones.

10. The adjustable attaching lens device as claimed in claim 1, wherein the flexible confining strip is formed as an integrated one.

\* \* \* \* \*